United States Patent
Liu

(10) Patent No.: US 9,113,414 B2
(45) Date of Patent: Aug. 18, 2015

(54) STANDBY METHOD FOR HANDHELD MOBILE TERMINAL, MICROPROCESSOR, AND MOBILE PHONE

(71) Applicant: Huawei Device Co., Ltd., Shenzhen (CN)

(72) Inventor: Weijie Liu, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 364 days.

(21) Appl. No.: 13/687,166

(22) Filed: Nov. 28, 2012

(65) Prior Publication Data

US 2013/0084924 A1 Apr. 4, 2013

Related U.S. Application Data

(63) Continuation of application No. PCT/CN2011/075260, filed on Jun. 3, 2011.

(30) Foreign Application Priority Data

Aug. 5, 2010 (CN) .......................... 2010 1 0252036

(51) Int. Cl.
*H04M 1/00* (2006.01)
*H04W 52/02* (2009.01)

(52) U.S. Cl.
CPC ...... *H04W 52/0225* (2013.01); *H04W 52/0254* (2013.01)

(58) Field of Classification Search
USPC ......... 455/343.1–343.6, 572, 574, 127.5, 441
See application file for complete search history.

(56) References Cited

U.S. PATENT DOCUMENTS

| 5,848,062 | A | * | 12/1998 | Ohno | 370/311 |
| 6,334,063 | B1 | | 12/2001 | Charlier et al. | |
| 8,183,937 | B2 | * | 5/2012 | McDonald et al. | 331/18 |
| 8,477,041 | B2 | * | 7/2013 | Hu et al. | 340/636.1 |
| 2004/0181703 | A1 | | 9/2004 | Lilja et al. | |
| 2004/0217652 | A1 | * | 11/2004 | Bitoh | 307/43 |
| 2008/0222440 | A1 | * | 9/2008 | Jones et al. | 713/400 |
| 2008/0254822 | A1 | | 10/2008 | Tilley | |
| 2009/0099812 | A1 | | 4/2009 | Kahn et al. | |
| 2010/0167792 | A1 | | 7/2010 | Chen et al. | |

(Continued)

FOREIGN PATENT DOCUMENTS

| CN | 101442589 A | 5/2009 |
| CN | 101567931 A | 10/2009 |

(Continued)

OTHER PUBLICATIONS

International Search Report received in Patent Cooperation Treaty Application No. PCT/CN2011/075260, mailed Sep. 15, 2011, 6 pages.

(Continued)

*Primary Examiner* — Dominic E Rego
(74) *Attorney, Agent, or Firm* — Slater & Matsil, L.L.P.

(57) ABSTRACT

A standby method for a handheld mobile terminal includes acquiring a physical state parameter of the terminal when it is determined that a handheld mobile terminal is in a no-operation state. It can be judged whether the physical state parameter satisfies a corresponding preset standby condition. The terminal is controlled to immediately enter a standby state when the physical state parameter satisfies the corresponding preset standby condition.

16 Claims, 7 Drawing Sheets

(56) References Cited

U.S. PATENT DOCUMENTS

| | | | |
|---|---|---|---|
| 2010/0330950 A1* | 12/2010 | Wells et al. | 455/404.1 |
| 2011/0038265 A1* | 2/2011 | Tao et al. | 370/241 |
| 2011/0278937 A1* | 11/2011 | Patino et al. | 307/80 |

FOREIGN PATENT DOCUMENTS

| | | | |
|---|---|---|---|
| CN | 101626425 | A | 1/2010 |
| CN | 101750073 | A | 6/2010 |
| CN | 101765188 | A | 6/2010 |
| CN | 101931697 | A | 12/2010 |
| JP | 2007-281864 | A | 10/2007 |
| WO | 2009147779 | A1 | 12/2009 |
| WO | WO 2011/015059 | A1 | 2/2011 |

OTHER PUBLICATIONS

First Chinese Office Action received in Chinese Application No. 201010252036.0, mailed Jun. 25, 2012, 16 pages.

Extended European Search Report received in Application No. PCT/CN2011/075260, Applicant: Huawei Device Co., Ltd., mailed Sep. 12, 2013, 7 pages.

Written Opinion of the International Searching Authority received in Application No. PCT/CN2011/075260, mailed Sep. 15, 2011, 5 pages.

Second Office Action received in Chinese Application No. 201010252036.0, mailed Feb. 17, 2013, 21 pages. (Partial Translation).

\* cited by examiner

STANDBY METHOD FOR HANDHELD MOBILE TERMINAL, MICROPROCESSOR, AND MOBILE PHONE

CROSS-REFERENCE TO RELATED APPLICATIONS

This application is a continuation of International Patent Application PCT/CN2011075260 entitled filed on Jun. 3, 2011 and which claims priority to Chinese Patent Application No. 201010252036.0, filed on Aug. 5, 2010, both of which are incorporated herein by reference.

TECHNICAL FIELD

The present invention relates to the field of mobile communication devices, and in particular, to a standby method for a handheld mobile terminal, a microprocessor, and a mobile phone.

BACKGROUND

Nowadays, mobile phone has become a communication tool for most people. If a user wants a mobile phone system to be on standby when using a mobile phone, two methods may be adopted.

In one method, the user manually presses a power source key, a screen lock key, or a keyboard lock key to lock a screen or a keyboard, so that a standby state is entered. In the other method, it is not required to manually press the key, and after the user performs no operation on the mobile phone, when a screen lock time or keyboard lock time (for example, 10 seconds) set by the system is reached, the screen is automatically blacked out and enters the standby state.

It can be seen from the foregoing description that, in the manual standby method, the operation is complex, the use frequency of the keys is increased, and the service life of the keys is shortened. In the method of entering the standby state according to the preset time, the screen is always in an on state in the process of waiting for the preset time, thereby wasting resources.

SUMMARY OF THE INVENTION

In view of this, the present invention provides a standby method for a handheld mobile terminal, a microprocessor, and a mobile phone, which solve the problem of complex operation and resource waste of the mobile terminal standby method in the prior art. The specific solutions are described as follows:

A standby method for a handheld mobile terminal includes a handheld mobile terminal is in a no-operation state, acquiring a physical state parameter of the terminal judging whether the physical state parameter satisfies a corresponding preset standby condition; and when the physical state parameter satisfies the corresponding preset standby condition, controlling the terminal to immediately enter a standby state.

A microprocessor includes a physical state parameter acquisition unit, configured to, when a handheld mobile terminal is in a no-operation state, acquire a physical state parameter of the terminal; a standby condition judgment unit, configured to judge whether the physical state parameter satisfies a corresponding preset standby condition; and a control unit, configured to control the terminal to immediately enter a standby state immediately when the physical state parameter satisfies the corresponding preset standby condition.

A mobile phone includes a radio frequency circuit, an audio circuit, and a power supply circuit, and further includes a sensor and a foregoing microprocessor, where the microprocessor is connected to the sensor. The sensor is configured to detect a physical state parameter of the mobile phone. The microprocessor is configured to acquire the physical state parameter of the mobile phone when the mobile phone is in a no-operation state, and control the mobile phone to immediately enter a standby state when the physical state parameter satisfies a corresponding preset standby condition.

It can be seen from the foregoing technical solutions that, in the standby method for a handheld mobile terminal disclosed in embodiments of the present invention, by judging whether the physical state parameter of the terminal satisfies the corresponding preset standby condition, a standby operation for the terminal is controlled, where the terminal immediately enters the standby state once satisfying a standby condition, thereby solving the problem of complex operation and resource waste in the standby method of the prior art. Meanwhile, the use frequency of terminals key is reduced and the service life of the terminal is prolonged.

BRIEF DESCRIPTION OF THE DRAWINGS

To illustrate the technical solutions according to the embodiments of the present invention or in the prior art more clearly, the accompanying drawings required for describing the embodiments or the prior art are introduced briefly in the following. Apparently, the accompanying drawings in the following descriptions merely show some of the embodiments of the present invention, and persons skilled in the art may obtain other drawings according to the accompanying drawings without creative efforts.

DETAILED DESCRIPTION OF ILLUSTRATIVE EMBODIMENTS

The technical solutions of embodiments of the present invention are to be clearly described in the following with reference to the accompanying drawings of the embodiments of the present invention. It is obvious that the embodiments to be described are a part rather than all of the embodiments of the present invention. All other embodiments obtained by persons skilled in the art based on the embodiments of the present invention without creative efforts shall fall within the protection scope of the present invention.

A standby method for a handheld mobile terminal is disclosed in the present invention, where when a terminal is in a no-operation state, a physical state parameter of the terminal is acquired, and the acquired physical state parameter is compared with a corresponding preset standby condition to determine whether the terminal satisfies a preset standby condition, so as to control the terminal satisfying a condition to immediately enter a standby state. The handheld mobile terminal described in the present invention may be a mobile phone or a PDA.

Embodiment 1

Figure 1:
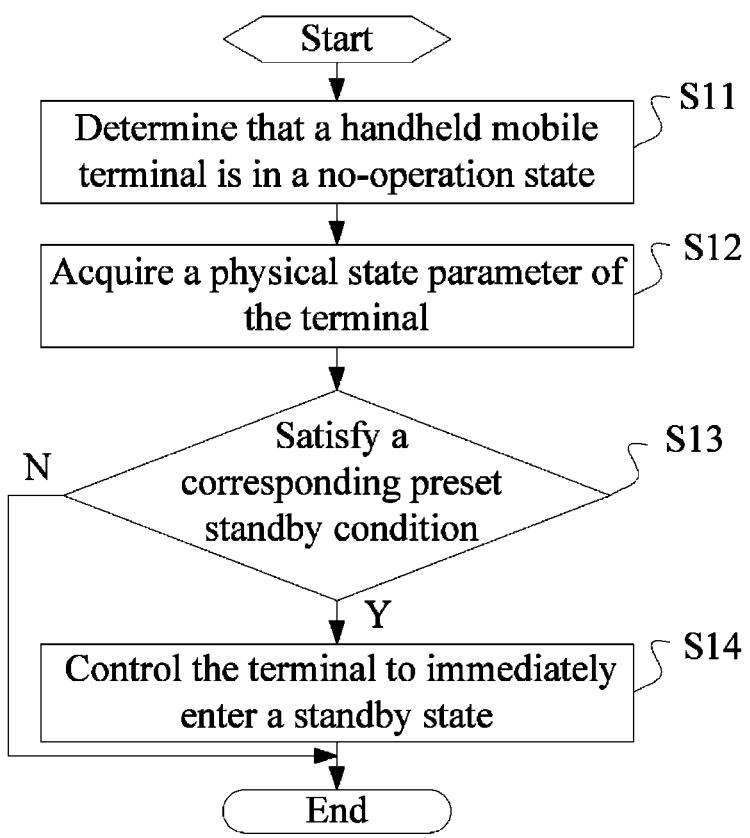
FIG. 1 is a flow chart of a standby method for a handheld mobile terminal disclosed in Embodiment 1 of the present invention.

A flow of a standby method for a handheld mobile terminal disclosed in Embodiment 1 of the present invention is shown in FIG. 1 and includes the following steps.

Step S11: Determine that a handheld mobile terminal is in a no-operation state.

It is first required to determine whether the terminal does not need to be used at this time. Only in the case that the terminal does not need to be used, a standby operation is performed. A process of determining that the terminal is in the no-operation state generally is detecting whether a key is pressed or a screen is touched. When no key of a mobile phone is pressed or the screen is not touched, it is determined that the mobile phone enters the no-operation state.

Step S12: Acquire a physical state parameter of the terminal.

The physical state parameter may be any one of or a combination of some of a motion state parameter, a location state parameter, and a temperature state parameter.

Step S13: Judge whether the physical state parameter satisfies a corresponding preset standby condition; if yes, perform step S14; if not, end the flow.

A process of judging whether the physical state parameter satisfies the corresponding preset standby condition may include: a process of judging whether a motion state parameter (for example, an acceleration value) of the terminal satisfies a corresponding preset standby condition, a process of judging whether a location state parameter (for example, an angle between the terminal and a horizontal plane) of the terminal satisfies a corresponding preset standby condition, or a process of judging whether a temperature state parameter (for example, a surface temperature of the terminal) of the terminal satisfies a corresponding preset standby condition, or a combination of any two of the above three processes or all of the above three processes.

Step S14: Control the terminal to immediately enter a standby state.

In the standby method for a handheld mobile terminal disclosed in this embodiment, by judging whether the physical state parameter satisfies the corresponding preset standby condition, a standby operation for the terminal is controlled, where the terminal immediately enters the standby state once satisfying the standby condition, thereby solving the problem of resource waste in waiting for the preset time in the standby method of the prior art. Meanwhile, manual operation is not required, thereby simplifying the operating steps, reducing the use frequency of terminal keys, and prolonging the service life of the terminal.

Embodiment 2

Figure 2:
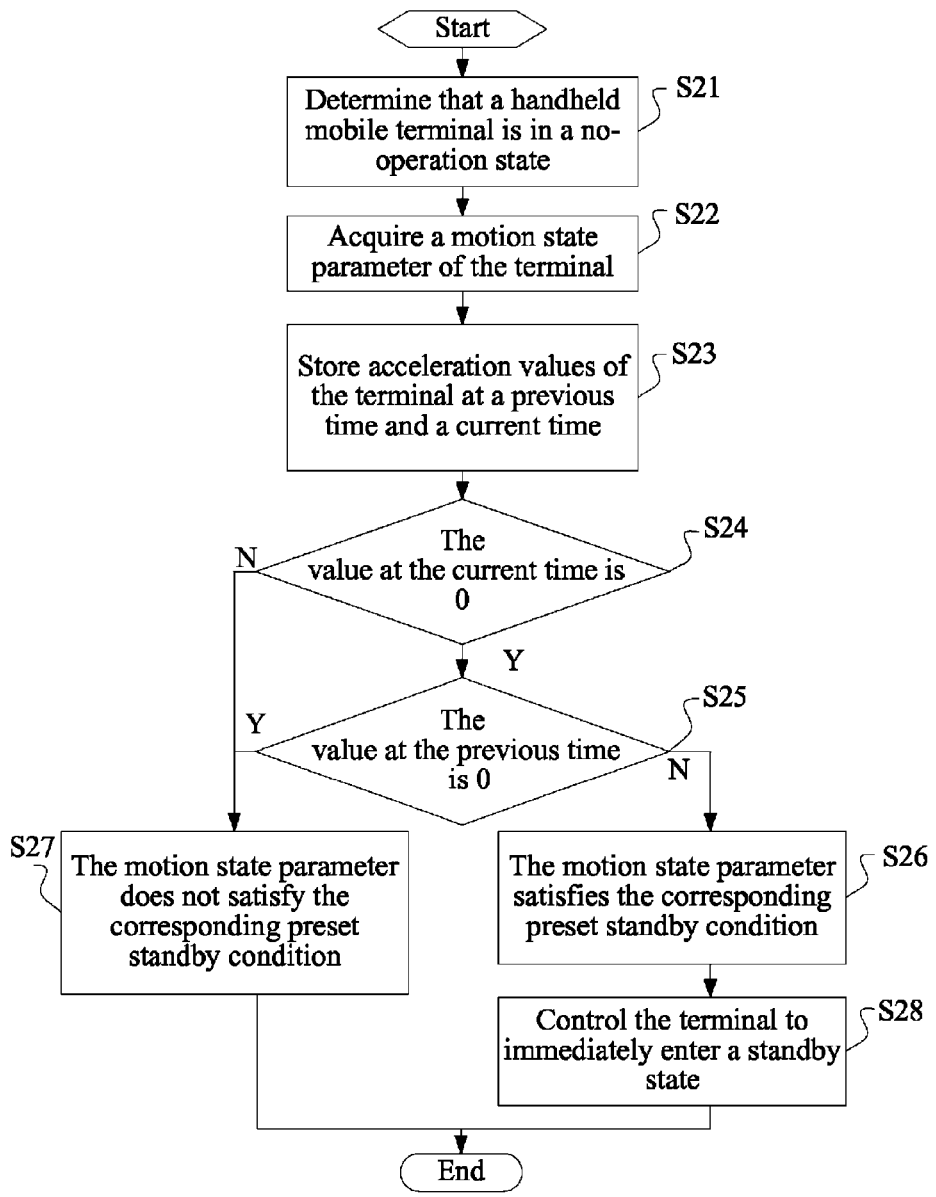
FIG. 2 is a flow chart of a standby method for a handheld mobile terminal disclosed in Embodiment 2 of the present invention.

A flow of a standby method for a handheld mobile terminal disclosed in this embodiment is shown in FIG. 2 and includes the following steps.

Step S21: Determine that a handheld mobile terminal is in a no-operation state.

Step S22: Acquire a motion state parameter of the terminal.

Here, the motion state parameter is an acceleration value of the terminal, a preset standby condition is that the acceleration value of the terminal changes from a non-zero value to 0, that is, it is judged whether the terminal changes from a motion state to a static state.

Step S23: Store acceleration values of the terminal at a previous time and a current time.

Step S24: Judge whether the acceleration value of the terminal at the current time is 0; if yes, perform step S25; if not, perform step S27.

Step S25: Judge whether the acceleration value at the previous time is 0; if yes, perform step S27; if not, perform step S26.

Step S26: Determine that the motion state parameter satisfies the corresponding preset standby condition, and perform step S28.

Step S27: Determine that the motion state parameter does not satisfy the corresponding preset standby condition, and end the flow.

Step S28: Control the terminal to immediately enter a standby state.

The specific standby operation varies with different types of terminals. If the terminal is a touch screen terminal, the standby operation is screen lock. If the terminal is a terminal with a keyboard, the standby operation is keyboard lock.

In this embodiment, it is determined whether the terminal changes from the motion state to the static state through a process of judging whether the acceleration value of the terminal changes from a non-zero value to 0. When the terminal changes from the motion state to the static state, a standby operation for the terminal is performed. In this embodiment, the motion state parameter is not limited to the acceleration value of the terminal and may also be a speed value of the terminal or other parameters for characterizing the motion state of the terminal. Different preset standby conditions are set according to different parameters. In this embodiment, the standby condition corresponding to the acceleration value is also not limited to that the acceleration of the terminal changes from the non-zero value to 0 and may also be that the acceleration value of the terminal reaches a preset maximum value, so as to adapt to judgment requirements in different cases.

In this embodiment, a standby condition is set according to an actual condition of terminal operation performed by a user. When the user no longer uses the terminal, the motion state of the terminal changes, and according to the change of the motion state, it is judged whether the terminal needs to enter the standby state. In this way, the state of the terminal is directly associated with the standby operation so that the standby operation is performed more timely.

In this embodiment, the acceleration value of the terminal may be acquired through an acceleration sensor.

Embodiment 3

Figure 3:
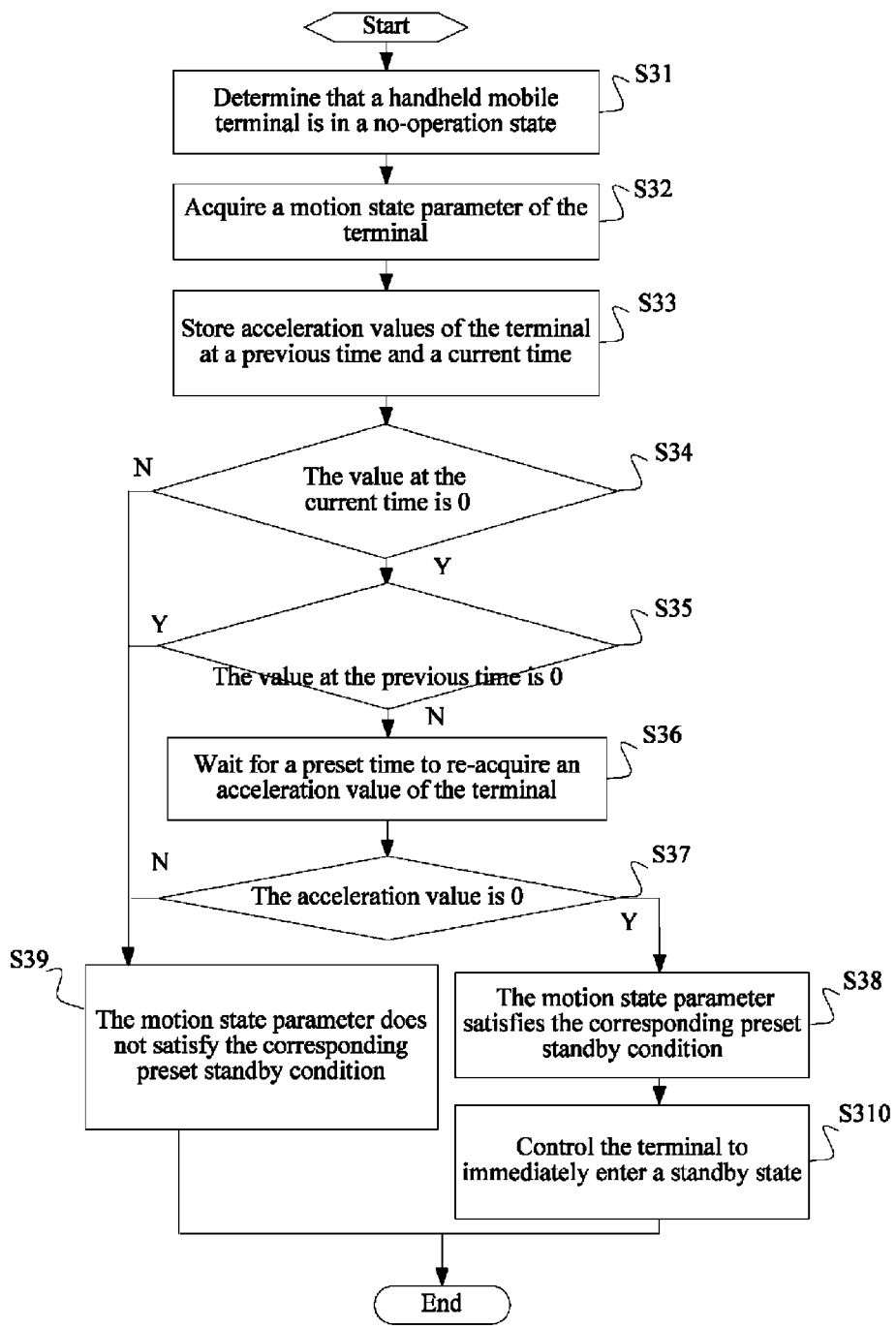
FIG. 3 is a flow chart of a standby method for a handheld mobile terminal disclosed in Embodiment 3 of the present invention.

A flow of a standby method for a handheld mobile terminal disclosed in this embodiment is shown in FIG. 3 and includes the following steps.

Step S31: Determine that a handheld mobile terminal is in a no-operation state.

Step S32: Acquire a motion state parameter of the terminal.

In this embodiment, a preset standby condition is still that the acceleration of the terminal changes from a non-zero value to 0, that is, it is still judged whether the terminal changes from a motion state to a static state.

Step S33: Store acceleration values of the terminal at a previous time and a current time.

Step S34: Judge whether the acceleration value of the terminal at the current time is 0; if yes, perform step S35; if not, perform step S39.

Step S35: Judge whether the acceleration value at the previous time is 0; if yes, perform step S39; if not, perform step S36.

Step S36: Wait for a preset time to re-acquire an acceleration value of the terminal, where the preset time is less than 5 s. The preset time may be is or 0.5 s, or may be flexibly set according to actual requirements.

Step S37: Judge whether the re-acquired acceleration value of the terminal is 0; if yes, perform step S38; if not, perform step S39.

If the acceleration value of the terminal is still 0 after waiting for the preset time, it indicates that the terminal is indeed static and subsequent operations may be performed.

Step S38: Determine that the motion state parameter satisfies the corresponding preset standby condition, and perform step S310.

Step S39: Determine that the motion state parameter does not satisfy the corresponding preset standby condition, and end the flow.

Step S310: Control the terminal to immediately enter a standby state.

In this embodiment, in the process of judging whether the motion state parameter satisfies the preset standby condition, a delay process is added, so as to avoid incorrect operation caused by a short pause during use by the user, thereby improving the reliability of implementation of the method. The preset waiting time in the delay process is far less than the waiting time for an automatic keyboard lock operation in the prior art. At present, in the setting of many mobile phones, the minimum delay time is 5 s; while in this embodiment, because the time spent in placing the mobile phone from a hand of the user onto a table top is judged and the time is far less than 5 s, for example, is or 0.5 s, compared with the prior art, this embodiment also has the advantage of reducing resource waste.

Embodiment 4

Figure 4:
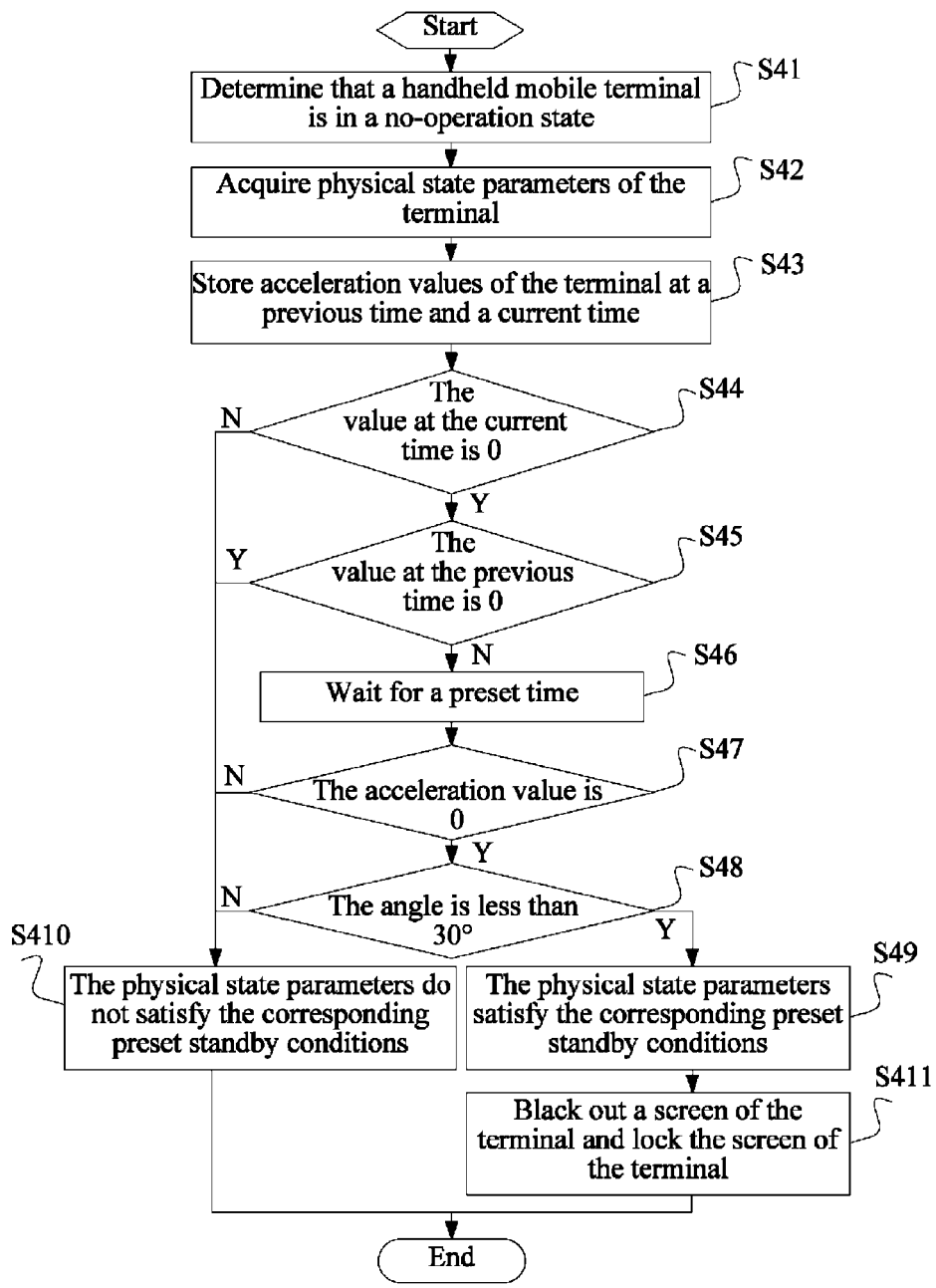
FIG. 4 is a flow chart of a standby method for a handheld mobile terminal disclosed in Embodiment 4 of the present invention.

A flow of a standby method for a handheld mobile terminal disclosed in this embodiment is shown in FIG. 4 and includes the following steps.

Step S41: Determine that a handheld mobile terminal is in a no-operation state.

Step S42: Acquire physical state parameters of the terminal, where the parameters include a motion state parameter and a location state parameter.

In this embodiment, the motion state parameter is still an acceleration value of the terminal, and a preset standby condition is still that the acceleration of the terminal changes from a non-zero value to 0, that is, it is still judged whether the terminal changes from a motion state to a static state.

In addition, the location state parameter is added in this embodiment. The location state parameter in this embodiment is an angle between the terminal and a horizontal plane, and a corresponding preset standby condition is that the angle between the terminal and the horizontal plane is less than 30°.

Step S43: Store acceleration values of the terminal at a previous time and a current time.

Step S44: Judge whether the acceleration value of the terminal at the current time is 0; if yes, perform step S45; if not, perform step S410.

Step S45: Judge whether the acceleration value at the previous time is 0; if yes, perform step S410; if not, perform step S46.

Step S46: Wait for a preset time to re-acquire an acceleration value of the terminal, where the preset time is less than 5 s. The preset time may be 1 s or 0.5 s, or may be flexibly set according to actual requirements.

Step S47: Judge whether the re-acquired acceleration value of the terminal is 0; if yes, perform step S48; if not, perform step S410.

When the re-acquired acceleration value of the terminal is 0 in step S47, the motion state parameter satisfies the corresponding preset standby condition. In this case, it is further judged whether the location state parameter satisfies the corresponding preset standby condition, that is, step S48.

Step S48: Judge whether the angle between the terminal and the horizontal plane is less than 30°; if yes, perform step S49; if not, perform step S410.

When the angle between the terminal and the horizontal plane is less than 30° in step S48, the location state parameter satisfies the corresponding preset standby condition. In this case, it is determined that two selected physical state parameters (the motion state parameter and the location state parameter) both satisfy respective corresponding preset standby conditions, that is, step S49.

Step S49: Determine that the physical state parameters satisfy the corresponding preset standby conditions, and perform step S411.

Step S410: Determine that the physical state parameters do not satisfy the corresponding preset standby conditions, and end the flow.

Step S411: Black out a screen of the terminal and lock the screen of the terminal.

In this embodiment, after the acceleration value of the terminal is determined, the angle between the terminal and the horizontal plane is additionally determined. When a user holds the terminal in hand to read an electronic book or photos, the terminal changes from the motion state to the static state, and at this time, if a standby operation is performed, normal use of the user is affected. Therefore, in view of actual applications, a preset angle condition is set, so that only when the terminal is in the static state and the angle between the terminal and the horizontal plane is less than a certain degree, it is determined that a standby parameter satisfies the preset standby condition. In this embodiment, it may also be first determined whether the location state parameter satisfies the corresponding preset standby condition, and after the location state parameter satisfies the corresponding preset standby condition, it is further determined whether the motion state parameter satisfies the corresponding preset standby condition. When the two physical state parameters (that is, the location state parameter and the motion state parameter) both satisfy the respective corresponding preset standby conditions, step S411 is performed.

In this embodiment, the location state parameter is not limited to the angle between the terminal and the horizontal plane, and may also be an angle between the terminal and a vertical plane, or other physical parameters capable of characterizing the location of the terminal. Similarly, in this embodiment, the preset angle condition is also not limited to that the angle is less than 30° and may also be other values.

Meanwhile, in this embodiment, the physical state parameters are also not limited to the motion state parameter and the location state parameter, but may be a combination of any physical state parameters, for example, may include the motion state parameter, the location state parameter, and a temperature state parameter at the same time, that is, on the basis of this embodiment, an ambient temperature around the terminal is additionally judged. The judging the ambient temperature around the terminal may be: assuming that the corresponding preset standby condition is that a surface temperature of the terminal is less than 35° C., it needs to judge whether the surface temperature of the terminal is less than 35° C.; if yes, it indicates that the terminal departs from the palm of the user, and a standby operation is performed; if not, it indicates that the terminal is still used in the palm of the user, and no standby operation is performed.

Furthermore, in addition to the foregoing three physical state parameters, a plurality of other physical state parameters may also be set, and judgment conditions corresponding to each physical state are set. The more the judgment conditions are, the higher the judgment accuracy is, and the smaller the possibility of incorrect operation is. However, because the judgment time is increased accordingly, suitable physical state parameters and corresponding judgment conditions need to be selected according to an actual situation Any one or combination of the physical state parameters and corresponding judgment conditions may be selected, which are not enumerated for ease of description; however, any one or more physical state parameters and corresponding judgment conditions may be selected by persons skilled in the art on the basis of the embodiment of the present invention. It should be noted that, when a plurality of physical state parameters and corresponding judgment conditions exist, the plurality of physical state parameters and the corresponding judgment conditions may be combined sequentially, that is, first, judgment is performed according to the judgment condition according to one physical state parameter; when a judgment result determines that the physical state parameter satisfies the corresponding preset standby condition, the terminal is controlled to enter a standby terminal; otherwise, when the judgment result determines that the physical state parameter does not satisfy the corresponding preset standby condition, judgment is performed according to the judgment condition corresponding to a next physical state parameter, and so on. Moreover, when it is judged whether more than two physical state parameters satisfy the corresponding judgment conditions, an order may be set according to requirements and is not limited here.

In this embodiment, the angle between the terminal and the horizontal plane may also be acquired through an acceleration sensor. In a process of acquiring the acceleration value by the acceleration sensor, the angle between the terminal and the horizontal plane is an intermediate parameter. Here, the intermediate parameter only needs to be taken as a further judgment condition without adding more hardware, thereby ensuring that the reliability of the method during application is further improved on the basis of not increasing the cost and development difficulty.

Embodiment 5

Figure 5:
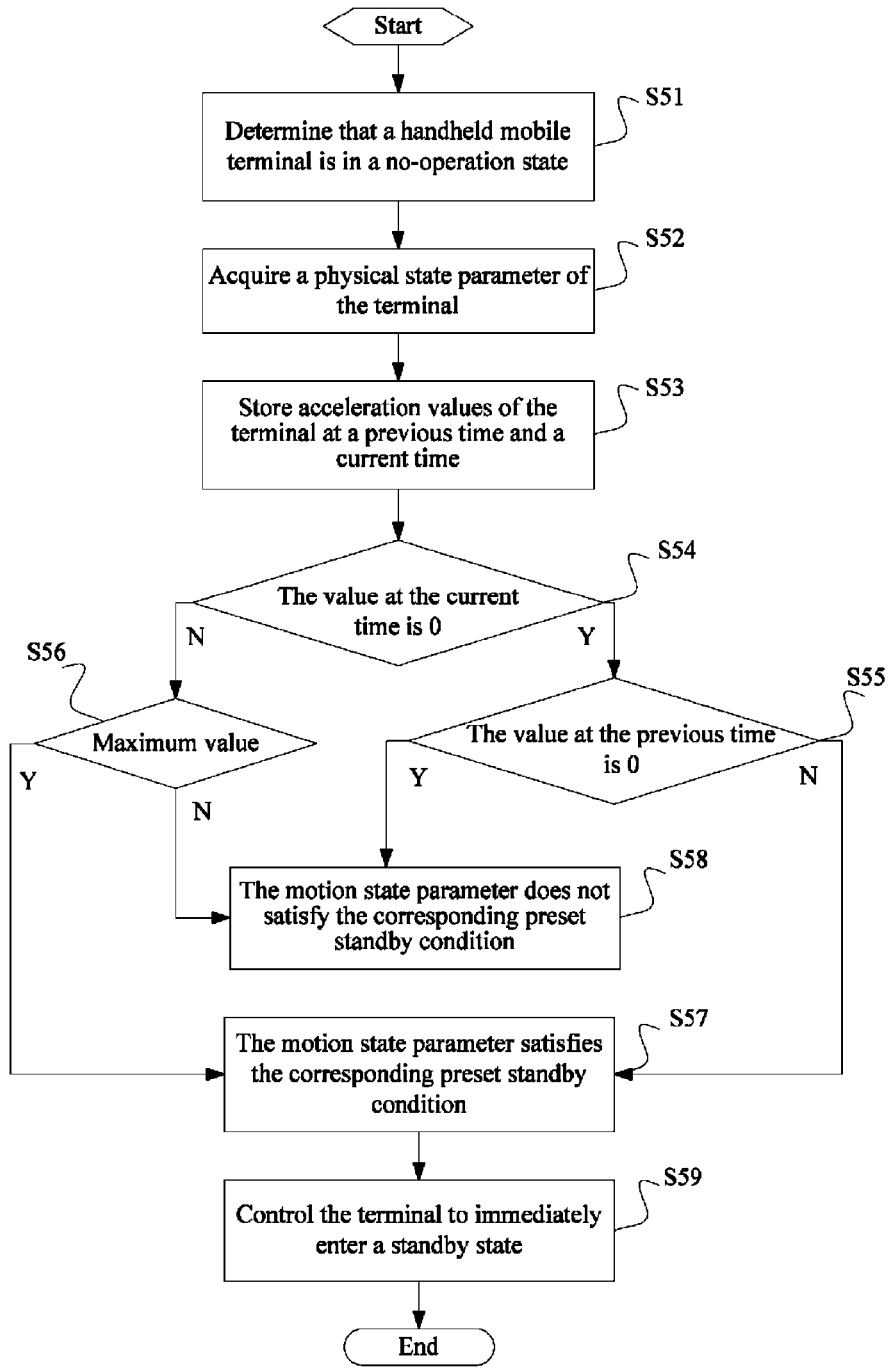
FIG. 5 is a flow chart of a standby method for a handheld mobile terminal disclosed in Embodiment 5 of the present invention.

A flow of a standby method for a handheld mobile terminal disclosed in this embodiment is shown in FIG. 5 and includes the following steps.

Step S51: Determine that a handheld mobile terminal is in a no-operation state.

Step S52: Acquire a physical state parameter of the terminal, where the physical state parameter includes a motion state parameter.

In this embodiment, a preset standby condition corresponding to the motion state parameter is that the acceleration of the terminal changes from a non-zero value to 0, that is, it is judged whether the terminal changes from a motion state to a static state; and the preset standby condition further includes that the acceleration of the terminal reaches a preset maximum value. When any one of the two preset standby conditions is satisfied, the preset standby condition is satisfied.

Step S53: Store acceleration values of the terminal at a previous time and a current time.

Step S54: Judge whether the acceleration value of the terminal at the current time is 0; if yes, perform step S55; if not, perform step S56.

Step S55: Judge whether the acceleration value at the previous time is 0; if yes, perform step S58; if not, perform step S57.

Step S56: Judge whether the acceleration value of the terminal at the current time reaches the preset maximum value; if yes, perform step S57; if not, perform step S58.

Step S57: Determine that the motion state parameter satisfies the preset standby condition, and perform step S59.

Step S58: Determine that the motion state parameter does not satisfy the preset standby condition, and end the flow.

Step S59: Control the terminal to immediately enter a standby state.

In the standby method for a handheld mobile terminal disclosed in this embodiment, two preset standby conditions corresponding to the acceleration value of the terminal are set to correspond to two different actual situations respectively. In the first situation, the acceleration value changes from a non-zero value to 0, reflecting the change of the terminal from the motion state to the static state, that is, a situation where a user places the terminal on a table top after using the terminal. In the other situation, a preset acceleration condition is that the acceleration value reaches a preset maximum value, which corresponds to an actual situation when the user needs to enable the terminal to enter the standby state, a large acceleration value is provided for the terminal, that is, the terminal may be shaken in any direction so that the acceleration value of the terminal reaches a large value which exceeds the preset maximum value set in the preset acceleration condition, so as to satisfy the standby condition and enter the standby state.

In the foregoing two manners, the acceleration value of the terminal is judged from two different angles, and the user may flexibly enable the terminal to enter the standby state through either of the manners, thereby expanding the application scope of the method. The problem that the standby state cannot be achieved because the acceleration value of the terminal cannot be changed to 0 when the user carries the terminal during outdoor activities is solved.

Figure 6:
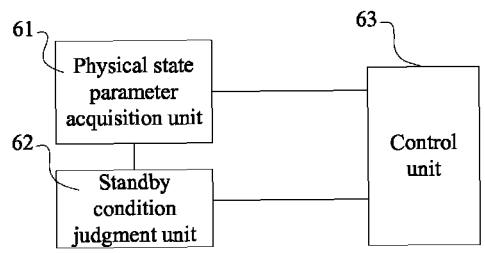
FIG. 6 is a schematic structural diagram of a microprocessor disclosed in the present invention.

A microprocessor applying the foregoing standby method is also disclosed in the present invention, which has a structure shown in FIG. 6, and includes a physical state parameter acquisition unit 61, a standby condition judgment unit 62, and a control unit 63.

The physical state parameter acquisition unit 61 is configured to, when it is determined that a handheld mobile terminal is in a no-operation state, acquire a physical state parameter of the terminal. The standby condition judgment unit 62 is configured to judge whether the physical state parameter satisfies a corresponding preset standby condition. The control unit 63 is configured to control the terminal to immediately enter a standby state when the physical state parameter satisfies the corresponding preset standby condition.

Figure 7:
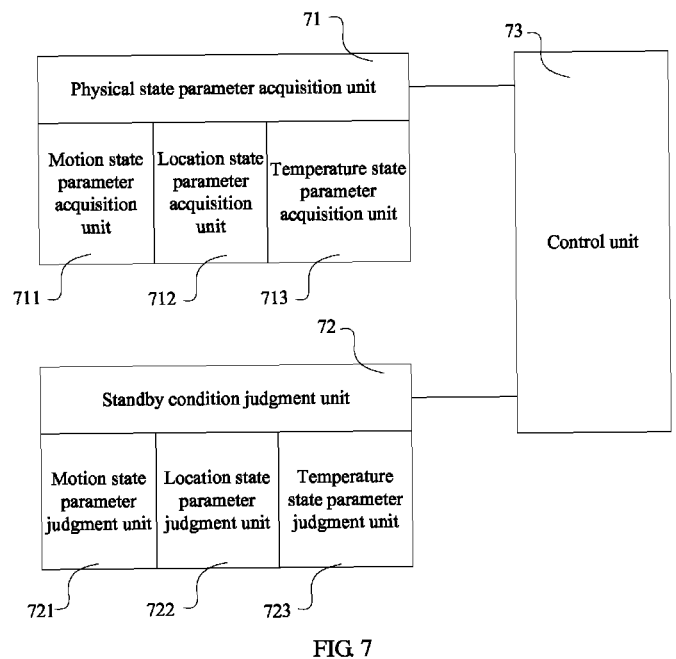
FIG. 7 is a schematic structural diagram of another microprocessor disclosed in the present invention.

As a plurality of physical state parameters exists in the method, the physical state parameter acquisition unit 61 and the standby condition judgment unit 62 of the microprocessor may also be disposed with a plurality of sub-units correspondingly. FIG. 7 is a schematic structural diagram of another microprocessor disclosed in the present invention. As shown in FIG. 7, the microprocessor includes a physical state parameter acquisition unit 71, a standby condition judgment unit 72, and a control unit 73. The physical state parameter acquisition unit 71 includes a motion state parameter acquisition unit 711, a location state parameter acquisition unit 712, and a temperature state parameter acquisition unit 713, and correspondingly the standby condition judgment unit 72 includes a motion state parameter judgment unit 721, a location state parameter judgment unit 722, and a temperature state parameter judgment unit 723.

The motion state parameter acquisition unit 711 is configured to acquire a motion state parameter of the terminal. The location state parameter acquisition unit 712 is configured to acquire a location state parameter of the terminal. The temperature state parameter acquisition unit 713 is configured to acquire a temperature state parameter of the terminal.

The motion state parameter judgment unit 721 is configured to judge whether the motion state parameter satisfies a corresponding standby condition. The location state parameter judgment unit 722 is configured to judge whether the location state parameter satisfies a corresponding standby condition. The temperature state parameter judgment unit 723 is configured to judge whether the temperature state parameter satisfies a corresponding standby condition.

Definitely, in this embodiment, the physical state parameter acquisition unit and the standby condition judgment unit are not limited to those shown in FIG. 7, and their internal structures may also have a plurality of combination forms to correspond to the foregoing standby method. For specific operations performed by each unit, reference may be made to the foregoing method embodiment, and the details are described here again.

Figure 8:
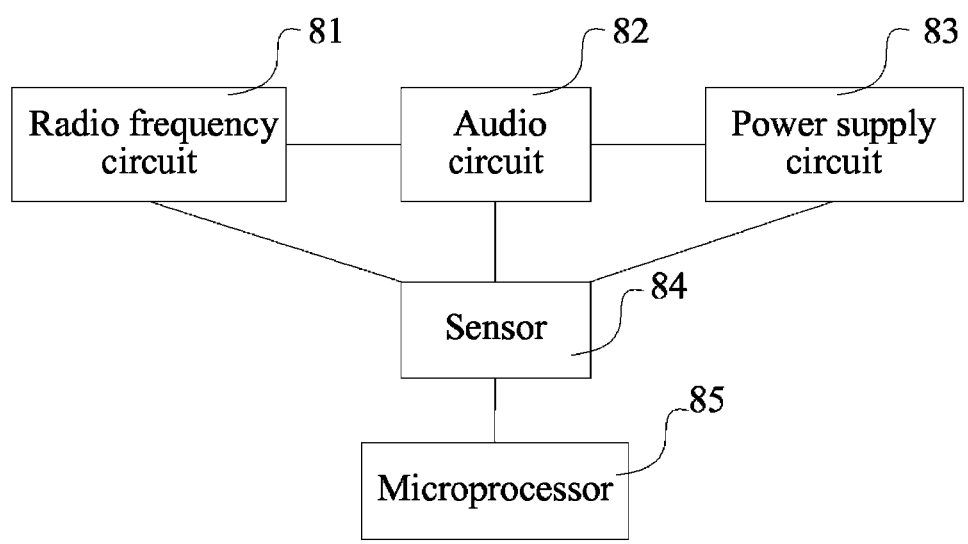
FIG. 8 is a schematic structural diagram of a mobile phone disclosed in the present invention.

A mobile phone is also disclosed in the present invention, which has a structure shown in FIG. 8, and includes a radio frequency circuit 81, an audio circuit 82, a power supply circuit 83, a sensor 84, and a microprocessor 85.

The sensor 84 is connected to the radio frequency circuit 81, the audio circuit 82, and the power supply circuit 83. The sensor 84 is configured to detect a physical state parameter of the mobile phone. The microprocessor 85 is connected to the sensor 84. The microprocessor 85 is configured to acquire the physical state parameter of the mobile phone when the mobile phone is in a no-operation state, and control the mobile phone to immediately enter a standby state when the physical state parameter satisfies a corresponding preset standby condition.

The radio frequency circuit 81 is configured to establish communication between the mobile phone and a wireless network to implement data receiving and sending between the mobile phone and the wireless network. The audio circuit 82 is configured to capture a sound and convert the captured sound into sound data, so that the mobile phone sends the sound data to the wireless network through the radio frequency circuit 81, and/or recover sound data, which is received by the mobile phone from the wireless network through the radio frequency circuit 81, to a sound and play the sound for a user. The power supply circuit 83 is configured to supply power to each circuit and/or component of the mobile phone.

In an actual application, the sensor may be any one or a combination of some of an acceleration sensor, an angle sensor, and a temperature sensor. Other sensors for detecting a physical state of the mobile phone may also be included. As the acceleration sensor acquires an angle between the mobile phone and a horizontal plane when measuring an acceleration value, the microprocessor may also use the acceleration sensor to judge a motion state parameter and a location state parameter of the mobile phone at the same time.

The microprocessor 85 may be the microprocessor shown in FIG. 6.

The embodiments in the present specification are described in a progressive manner. Each embodiment focuses on something different from other embodiments, and for the same or similar parts, reference may be made among the embodiments. Because the device disclosed in the embodiments is corresponding to the method disclosed in the embodiments, the description is given briefly, and for relevant parts, reference may be made to the description of the method.

Persons skilled in the art may further realize that, in combination with the embodiments disclosed here, described units and algorithm steps of each example can be implemented with electronic hardware, computer software, or a combination thereof. In order to clearly describe the interchangeability between the hardware and the software, compositions and steps of each example have been generally described according to functions in the foregoing descriptions. Whether these functions are executed as hardware or software depends on particular applications and design constraint conditions of the technical solutions. Persons skilled in the art may use different methods to implement the described functions for each particular application, but the implementation should not be considered as going beyond the scope of the present invention.

In combination with the embodiments disclosed here, described steps of the method or algorithm may be directly implemented by using hardware, a software module executed by a processor, or a combination of the two. The software module may be placed in a random access memory (RAM), a memory, a read-only memory (ROM), an electrically programmable ROM, an electrically erasable programmable ROM, a register, a hard disk, a removable magnetic disk, a CD-ROM, or any storage medium of other forms well-known in the technical field.

The descriptions about the disclosed embodiments enable persons skilled in the art to implement or use the present invention. Various modifications of the embodiments are apparent to persons skilled in the art, and general principles defined here may be implemented in other embodiments without departing from the spirit or scope of the present invention. Therefore, the present invention is not limited to the embodiments described here, but shall fall within the broadest scope in line with the principles and novel features disclosed here.

What is claimed is:

1. A standby method for a handheld mobile terminal, the method comprising:
   when the handheld mobile terminal is in a no-operation state, acquiring a physical state parameter of a handheld/mobile terminal when the terminal is in a no-operation state;
   judging whether the physical state parameter satisfies a corresponding preset standby condition; and
   controlling the terminal to immediately enter a standby state when the physical state parameter satisfies the corresponding preset standby condition;
   wherein the no-operation state is a state where inputs of the terminal are free of interaction by a user of the terminal.

2. The method according to claim 1, wherein the physical state parameter comprises one or more of a motion state parameter, a location state parameter, and a temperature state parameter.

3. The method according to claim 2, wherein the physical state parameter comprises the motion state parameter,
wherein the motion state parameter comprises an acceleration value of the terminal, and
wherein the preset standby condition corresponding to the motion state parameter comprises that the acceleration value of the terminal changes from a non-zero value to 0 or that the acceleration value of the terminal reaches a preset maximum value.

4. The method according to claim 3, wherein a process of judging whether the physical state parameter satisfies the corresponding preset standby condition comprises:
storing acceleration values of the terminal at a previous time and a current time; and
when the acceleration value at the current time is 0, determining whether the acceleration value at the previous time is a non-zero value, if the acceleration value at the previous time is the non-zero value, determining that the motion state parameter satisfies the corresponding preset standby condition; and if the acceleration value at the previous time is 0, determining that the motion state parameter does not satisfy the corresponding preset standby condition.

5. The method according to claim 3, wherein judging whether the physical state parameter satisfies the corresponding preset standby condition comprises:
storing acceleration values of the terminal at a previous time and a current time; and
when the acceleration value at the current time is 0, determining whether the acceleration value at the previous time is a non-zero value, if the acceleration value at the previous time is 0, determining that the motion state parameter does not satisfy the corresponding preset standby condition; if the acceleration value at the previous time is the non-zero value, a preset time is waited for, and then an acceleration value of the terminal is re-acquired after waiting for the preset time, the preset time being less than 5 s; if a re-acquired acceleration value of the terminal is 0, determining that the motion state parameter satisfies the corresponding preset standby condition; and if the re-acquired acceleration value of the terminal is not 0, determining that the motion state parameter does not satisfy the corresponding preset standby condition.

6. The method according to claim 3, wherein judging whether the physical state parameter satisfies the corresponding preset standby condition comprises:
determining whether an acceleration value at a current time reaches the preset maximum value, if the acceleration value at the current time reaches the preset maximum, determining that the motion state parameter satisfies the corresponding preset standby condition; and if the acceleration value at the current time does not reach the preset maximum, determining that the motion state parameter does not satisfy the corresponding preset standby condition.

7. The method according to claim 2, wherein the physical state parameter comprises the location state parameter,
wherein the location state parameter comprises an angle between the terminal and a horizontal plane; and
wherein the preset standby condition corresponding to the location state parameter comprises that the angle between the terminal and the horizontal plane is less than 30°.

8. The method according to claim 7, wherein the physical state parameter also comprises the motion state parameter and wherein judging whether the physical state parameter satisfies preset standby conditions comprises:
storing acceleration values of the terminal at a previous time and a current time; and
when the acceleration value at the current time is 0, judging whether the acceleration value at the previous time is a non-zero value, if the acceleration value at the previous time is 0, determining that the motion state parameter does not satisfy the corresponding preset standby condition; if the acceleration value at the previous time is the non-zero value, a preset time is waited for, and then an acceleration value of the terminal is re-acquired after waiting for the preset time, the preset time being less than 5 s; if a re-acquired acceleration value of the terminal is not 0, determining that the motion state parameter does not satisfy the corresponding preset standby condition; and if the re-acquired acceleration value of the terminal is 0, it is judged whether the angle between the terminal and the horizontal plane is less than 30°; if the angle is less than 30°, determining that the location state parameter satisfies the corresponding preset standby condition; and if the angle is not less than 30°, determining that the location state parameter does not satisfy the corresponding preset standby condition.

9. The method according to claim 2, wherein the physical state parameter comprises the temperature state parameter,
wherein the temperature state parameter comprises a surface temperature of the terminal; and
wherein the preset standby condition corresponding to the temperature state parameter comprises that the surface temperature of the terminal is less than 35° C.

10. A microprocessor, comprising:
a physical state parameter acquisition unit, configured to acquire a physical state parameter of a handheld mobile terminal when it is determined that the terminal is in a no-operation state, wherein the no-operation state is a state where inputs of the terminal are free of interaction by a user of the terminal;
a standby condition judgment unit, configured to judge whether the physical state parameter satisfies a corresponding preset standby condition; and
a control unit, configured to control the terminal to immediately enter a standby state when the physical state parameter satisfies the corresponding preset standby condition.

11. The microprocessor according to claim 10, wherein the physical state parameter acquisition unit comprises a motion state parameter acquisition unit, a location state parameter acquisition unit, and/or a temperature state parameter acquisition unit, wherein:
the motion state parameter acquisition unit is configured to acquire a motion state parameter of the terminal;
the location state parameter acquisition unit is configured to acquire a location state parameter of the terminal; and
the temperature state parameter acquisition unit is configured to acquire a temperature state parameter of the terminal.

12. The microprocessor according to claim 11, wherein the standby condition judgment unit comprises a motion state parameter judgment unit, a location state parameter judgment unit, and/or a temperature state parameter judgment unit, wherein:
- the motion state parameter judgment unit is configured to judge whether the motion state parameter satisfies a corresponding standby condition;
- the location state parameter judgment unit is configured to judge whether the location state parameter satisfies a corresponding standby condition; and
- the temperature state parameter judgment unit is configured to judge whether the temperature state parameter satisfies a corresponding standby condition.

13. A mobile phone, comprising a radio frequency circuit;
an audio circuit;
a power supply circuit;
a sensor; and
the microprocessor according to claim 12,
wherein the microprocessor is connected to the sensor,
wherein the sensor is configured to detect a physical state parameter of the mobile phone, and
wherein the microprocessor is configured to acquire the physical state parameter of the mobile phone when the mobile phone is in a no-operation state, and to control the mobile phone to immediately enter a standby state when the physical state parameter satisfies a corresponding preset standby condition.

14. A mobile phone, comprising a radio frequency circuit;
an audio circuit;
a power supply circuit;
a sensor; and
the microprocessor according to claim 11,
wherein the microprocessor is connected to the sensor,
wherein the sensor is configured to detect a physical state parameter of the mobile phone, and
wherein the microprocessor is configured to acquire the physical state parameter of the mobile phone when the mobile phone is in a no-operation state, and to control the mobile phone to immediately enter a standby state when the physical state parameter satisfies a corresponding preset standby condition.

15. A mobile phone, comprising:
a radio frequency circuit:
an audio circuit;
a power supply circuit;
a sensor; and
the microprocessor according to claim 10,
wherein the microprocessor is connected to the sensor,
wherein the sensor is configured to detect a physical state parameter of the mobile phone, and
wherein the microprocessor is configured to acquire the physical state parameter of the mobile phone when the mobile phone is in a no-operation state, and to control the mobile phone to immediately enter a standby state when the physical state parameter satisfies a corresponding preset standby condition.

16. The mobile phone according to claim 15, wherein the sensor comprises an acceleration sensor, an angle sensor, and/or a temperature sensor.

* * * * *